United States Patent [19]

Berger

[11] 4,068,885
[45] Jan. 17, 1978

[54] RETRACTABLE HEAT SHIELD FOR VEHICLES

[76] Inventor: Leon H. Berger, 38 Indiana Ave., Long Beach, N.Y. 11561

[21] Appl. No.: 756,900

[22] Filed: Jan. 5, 1977

[51] Int. Cl.² ............................................. B60N 3/06
[52] U.S. Cl. ............................................... 296/78 R
[58] Field of Search ................................... 296/78 R

[56] References Cited

U.S. PATENT DOCUMENTS

| 835,869 | 10/1906 | Ryan | 296/78 R |
|---|---|---|---|
| 2,842,868 | 7/1958 | Belter | 296/78 R |

*Primary Examiner*—Richard A. Bertsch

[57] ABSTRACT

A retractable heat shield for the roof of a vehicle includes a pair of end housings adapted to be detachably mounted adjacent the rear of a vehicle roof and a pair of telescopable members connected to each of such end housings to extend therefrom in generally parallel relation. A rod element is connected between the end housings and carries a shade element rollably thereon. A second pair of end housings are connected respectively to the other ends of the telescopable members and a transverse support rod is connected between the second pair of end housings. Hook elements are carried by the free edge of the shade element adapted to detachably mount the free end of the shade element on such support rod. Suction cups are carried by each of the end housings so that the heat shield can be removably mounted on the roof of a vehicle.

5 Claims, 3 Drawing Figures

RETRACTABLE HEAT SHIELD FOR VEHICLES

BACKGROUND OF THE INVENTION

The present invention relates to heat shields for vehicles and more particularly to a heat shield which can be extended for use and retracted for compact storage.

The need for a heat shield to protect the top of a vehicle from the direct rays of the sun and to thereby minimize the thermal effect of the sun within the vehicle has been known heretofore. U.S. Pat. No. 2,629,347 issued Feb. 24, 1953 to H. P. Wittrien, for example, discloses heat protector roof constructions whereby an accessory structure is so mounted on the vehicle roof as to provide a space between same and the roof. Such accessory may either be releasably mounted on the roof or it may be built into the vehicle as an integral part thereof. Similar structures are disclosed in other prior patents. However, characteristically such earlier heat shields have been relatively large devices, not adjustable to vehicles of different sizes, and not collapsible into compact form for storage.

SUMMARY OF THE INVENTION

It is one object of the invention to provide a retractable heat shield for the roof of a vehicle which is adjustable so as to be removably mountable on vehicles of various sizes.

It is another object of the invention to provide a retractable heat shield for the roof of a vehicle which is collapsible into compact form for storage.

It is still another object of the invention to provide a retractable heat shield of the character described which is relatively simple in construction and, therefore, can be manufactured at relatively low cost.

Other objects and advantages of the invention will become readily apparent to persons skilled in the art from the following description of the invention.

According to the present invention there is provided a retractable heat shield for the roof of a vehicle comprising in combination a first pair of end housings and a first rod element connected therebetween so as to maintain the end housings in spaced relation; a flexible shade element mounted rollably on the first rod element; first and second pairs of elongated telescopable members, one end of each of the pairs of telescopable members being connected to respective ones of the end housings, the pairs of telescopable members being adapted to extend in spaced generally parallel relation; a second pair of end housings connected respectively to the other ends of the pairs of telescopable members; a transverse support rod connected between the second pair of end housings in generally parallel relation to the first rod element; means carried by the shade element adjacent the free edge thereof adapted to detachably mount same on the transverse support rod; and means on each of the end housings for removably mounting the same on the roof of a vehicle, whereby the shade element may be selectively extended in spaced overlying relation to the roof of a vehicle.

BRIEF DESCRIPTION OF THE DRAWING

In order that the invention may be more fully comprehended it will now be described, by way of example, with reference to the accompanying drawings in which.

DETAILED DESCRIPTION OF THE PREFERRED EMBODIMENT

Figure 1:
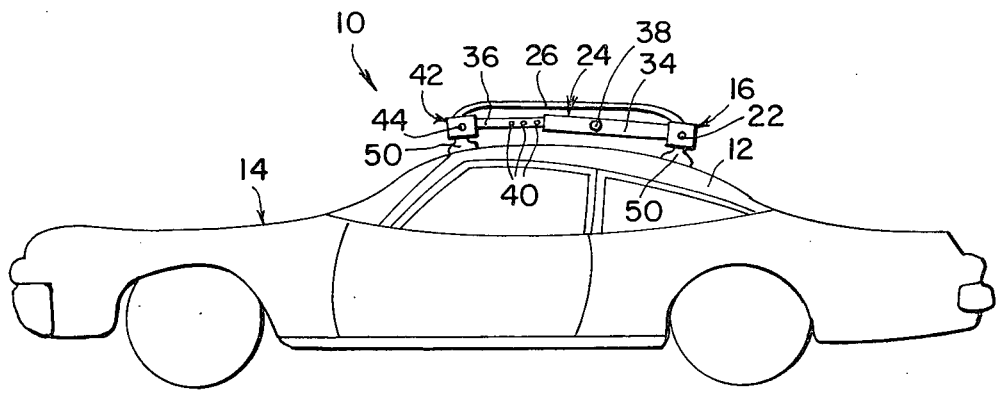
FIG. 1 is a side view of an automobile upon which the retractable heat shield of the invention is mounted.
Figure 2:
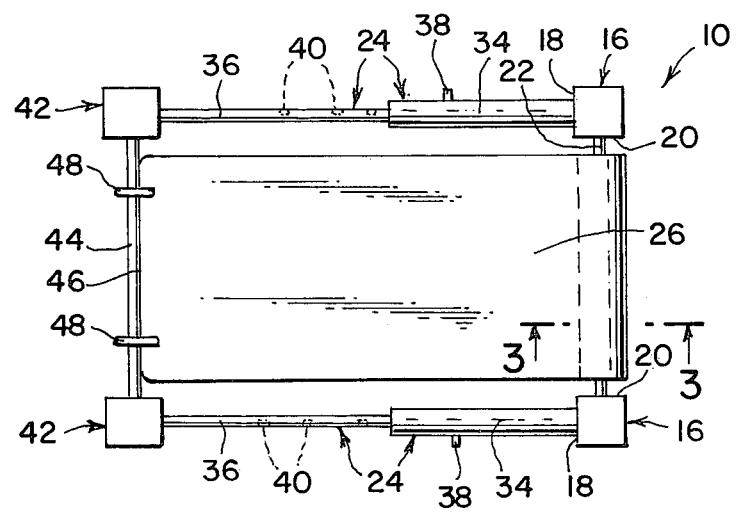
FIG. 2 is a top plan view of the retractable heat shield shown in FIG. 1.

Referring to the drawings there is shown generally, as indicated by reference numeral 10, a retractable heat shield mounted upon the roof 12 of an automobile 14.

The heat shield includes a first pair of end housings 16 which in the presently preferred form simply consist of box-like enclosures having openings in two adjacent faces 18, 20 thereof so as to receive and support therein respectively a first rod element 22 and one end of one of a pair of telescopable members 24.

Figure 3:
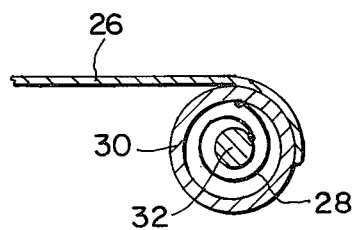
FIG. 3 is a cross-sectional view of the shade element shown in FIG. 1 taken along line 3—3 thereof.

The rod element 22 is desirably rotatably mounted in the end housings and is adapted to carry a flexible shade element 26 thereon. The shade element may thus be rolled onto rod element 22 for storage or extended so as to overlie the roof of the vehicle as shown in FIG. 1. In a preferred embodiment, as depicted in FIG. 3, the shade element comprises a spring-loaded shade member which includes a coil spring 28 secured between an outer shell element 30 and an inner rod 32. The inner rod may serve as first rod element 22 and may thus be mounted in end housings 16 in the same manner as the conventional window shade is carried by the window brackets. There would thus appear to be no reason to encumber the present specification with the details of such construction. The shade element is desirably fabricated of a material having good thermal insulating properties; however, it must be sufficiently flexible that it can be wound upon rod element 22 to facilitate storage.

A pair of telescopable members 24 are provided so as to be extendable along each of the sides of the vehicle roof. Thus, one such pair is connected to one of end housings 16 and another like pair of telescopable members is connected to the other of the end housings. Each pair of telescopable members desirably includes a first hollow tubular element 34 and a second tubular element 36 which is dimensioned to fit slidably therewithin. Means such as spring-loaded detent pins 38 are provided on one of the elements 34, 36 positionable in apertures 40 formed in the other of such tubular elements in order to releasably lock such elements in any one of a series of selected positions relative to each other. Locking means of this type are known per se and are widely used to permit longitudinal adjustment of telescopable elements of this type.

A second pair of end housings 42 are provided and are connected to the ends of the telescopable members 24 remote from end housings 16. Connected between end housings 42 is a transverse support rod 44. The support rod extends substantially parallel to rod element 22.

The shade element is provided on its free edge 46 with means such as hook elements 48 for detachably mounting the free end thereof on the support rod. Thus, the shade element can be drawn from its rollable support carried by end housings 16 and connected by the hook elements to the transverse support rod. The shade element will then extend in spaced overlying relation with respect to the roof of the vehicle.

The undersurface of each of the end housings 16, 42 is provided with means for removably securing same to the roof of a vehicle. Preferably such means comprise suction cups 50.

From the foregoing description it will be seen that a retractable heat shield for vehicles has been provided which is simply constructed, collapsible into a compact storage condition and extendable to the desired length so as to adjust to the size of the roof to be protected. It will, of course, be appreciated that while FIG. 1 of the drawings illustrates the shield as being secured to the roof of an automobile the device can be employed with equal effectiveness on an airplane or boat. Further, in affording lengthwise adjustment of the shade element and of the side members 24 the device is adaptable for installation on vehicles having a relatively wide range of sizes.

I claim:

1. A retractable heat shield for the roof of a vehicle comprising in combination:
    a first pair of end housings and a first rod element connected therebetween so as to maintain said end housings in spaced relation;
    a flexible shade element mounted rollably on said first rod element;
    first and second pairs of elongated telescopable members, one end of each of said pairs of telescopable members being connected to respective ones of said end housings, said pairs of telescopable members being adapted to extend in spaced generally parallel relation;
    a second pair of end housings connected respectively to the other ends of said pairs of telescopable members;
    a transverse support rod connected between said second pair of end housings in generally parallel relation to said first rod element;
    means carried by said shade element adjacent the free edge thereof adapted to detachably mount same on said transverse support rod; and
    means on each of said end housings for removably mounting the same on the roof of a vehicle, whereby said shade element may be selectively extended in spaced overlying relation to the roof of a vehicle.

2. A retractable heat shield according to claim 1, wherein said shade element comprises a spring-loaded shade member and said first rod element comprises the roller therefor.

3. A retractable heat shield according to claim 1, wherein each of said pair of telescopable members comprises a first hollow tubular element and a second tubular element dimensioned to fit slidably therein, means being provided on said tubular elements for releasably locking same in selected positions relative to each other.

4. A retractable heat shield according to claim 1, wherein said means for detachably mounting said end housings on the roof of a vehicle comprise suction cups.

5. A retractable heat shield according to claim 1, wherein said means for detachably mounting said shade element on said transverse support rod comprise hook means.

* * * * *